(12) United States Patent
Tesar

(10) Patent No.: US 11,166,864 B2
(45) Date of Patent: Nov. 9, 2021

(54) ACTUATORS FOR PATIENT MOBILITY DEVICES, PATIENT HEALTHCARE DEVICES AND HUMAN PROSTHETICS

(71) Applicant: Delbert Tesar, Austin, TX (US)

(72) Inventor: Delbert Tesar, Austin, TX (US)

(*) Notice: Subject to any disclaimer, the term of this patent is extended or adjusted under 35 U.S.C. 154(b) by 153 days.

(21) Appl. No.: 15/834,046

(22) Filed: Dec. 6, 2017

(65) Prior Publication Data

US 2018/0153757 A1 Jun. 7, 2018

Related U.S. Application Data

(60) Provisional application No. 62/430,916, filed on Dec. 6, 2016.

(51) Int. Cl.
| | |
|---|---|
| *A61H 1/02* | (2006.01) |
| *B25J 9/00* | (2006.01) |
| *A61G 5/10* | (2006.01) |
| *A61G 7/10* | (2006.01) |

(52) U.S. Cl.
CPC ............ *A61H 1/02* (2013.01); *A61G 5/1094* (2016.11); *A61G 7/1038* (2013.01); *A61G 7/1048* (2013.01); *A61G 7/1076* (2013.01); *A61H 1/0285* (2013.01); *B25J 9/0006* (2013.01); *A61H 1/0237* (2013.01);
(Continued)

(58) Field of Classification Search
CPC ...... A61H 1/02; A61H 1/0237; A61H 1/0274; A61H 1/0285; A61H 2201/1215; A61H 2201/1454; A61H 2201/165; B25J 9/0006; B25J 9/126; A61F 2/78; A61F 2002/501
See application file for complete search history.

(56) References Cited

U.S. PATENT DOCUMENTS

| 381,395 A | 4/1888 | Love |
|---|---|---|
| 1,973,185 A | 9/1934 | Treojevich |
| 2,140,012 A | 12/1938 | Hayes |

(Continued)

FOREIGN PATENT DOCUMENTS

WO 2006/125282 A1 11/2006

OTHER PUBLICATIONS

Bram Vanderborght, Nikos G. Tsagarakis, Claudio Semini, Ronald Van Ham, Darwin G. Caldwell, "MACCEPA 2.0: Adjustable Compliant Actuator with Stiffening Characteristic for Energy Efficient Hopping", 2009 IEEE International Conference on Robotics and Automation (Kobe International Conference Center, Kobe, Japan, May 12-17, 2009).

(Continued)

*Primary Examiner* — Christie L Bahena
(74) *Attorney, Agent, or Firm* — John A. Fortkort; Fortkort & Houston PC

(57) ABSTRACT

An orthotic device is provided which includes a first structural element; a second structural element which is rotatably attached to the first structural element across a joint; a first rotary actuator which imparts rotational motion to the first structural element relative to the second structural element about a first axis; and a second rotary actuator which imparts rotational motion to the first structural element relative to the second structural element about a second axis. Each of the first and second rotary actuators is selected from the group consisting of parallel eccentric actuators and rotary actuators.

11 Claims, 15 Drawing Sheets

Conceptual 7 DOF Upper Extremity Orthotic Device

(52) U.S. Cl.
CPC ............... *A61H 2201/1215* (2013.01); *A61H 2201/1246* (2013.01); *A61H 2201/1454* (2013.01); *A61H 2201/165* (2013.01)

(56) References Cited

U.S. PATENT DOCUMENTS

| | | | |
|---|---|---|---|
| 2,195,783 A | 4/1940 | Ravigneaux | |
| 2,231,784 A | 2/1941 | Von Thungen | |
| 2,241,764 A | 5/1941 | Bollinger et al. | |
| 2,311,006 A | 2/1943 | Trbojevich | |
| 2,320,757 A | 6/1943 | Sinclair et al. | |
| 2,534,134 A | 12/1950 | Kirkpatrick | |
| 2,627,190 A | 2/1953 | Böttcher | |
| 2,703,021 A | 3/1955 | Stoeckicht | |
| 2,844,052 A | 7/1958 | Stoeckicht | |
| 2,861,465 A | 11/1958 | Winkle et al. | |
| 3,064,491 A | 11/1962 | Bishop | |
| 3,095,757 A | 7/1963 | Thoma | |
| 3,150,532 A | 9/1964 | Bixby | |
| 3,251,236 A | 5/1966 | Wildhaber | |
| 3,396,632 A | 8/1968 | Leblanc | |
| 3,397,589 A | 8/1968 | Moore | |
| 3,563,354 A | 2/1971 | Sigg | |
| 3,719,841 A | 3/1973 | Ritsema | |
| 3,742,568 A | 7/1973 | Hahlbeck | |
| 3,772,932 A | 11/1973 | Nagano | |
| 3,813,821 A | 6/1974 | Takahashi | |
| 3,823,620 A | 7/1974 | Bricout | |
| 3,888,134 A | 6/1975 | Miranda | |
| 3,901,092 A | 8/1975 | Romick | |
| 3,907,470 A | 9/1975 | Harle et al. | |
| 3,941,013 A | 3/1976 | Miller | |
| 4,024,959 A | 5/1977 | Gruner | |
| 4,158,967 A | 6/1979 | Vatterott | |
| 4,186,626 A | 2/1980 | Chamberelain | |
| 4,237,741 A | 12/1980 | Huf et al. | |
| 4,280,583 A | 7/1981 | Stieg | |
| 4,297,918 A | 11/1981 | Perry | |
| 4,378,660 A | 4/1983 | Weiner | |
| 4,381,828 A | 5/1983 | Lunn et al. | |
| 4,407,382 A | 10/1983 | Ddziuba et al. | |
| 4,416,345 A | 11/1983 | Barthelemy | |
| 4,417,642 A | 11/1983 | Suzuki et al. | |
| 4,461,375 A | 7/1984 | Brown | |
| 4,462,271 A | 7/1984 | Stieg | |
| 4,467,568 A | 8/1984 | Bloch et al. | |
| 4,505,166 A | 3/1985 | Tesar | |
| 4,540,073 A | 9/1985 | Rogier | |
| 4,547,107 A | 10/1985 | Krause | |
| 4,554,842 A | 11/1985 | Wood, III | |
| 4,560,056 A | 12/1985 | Stockton | |
| 4,569,252 A | 2/1986 | Harper | |
| 4,583,413 A | 4/1986 | Lack | |
| 4,624,154 A | 11/1986 | Kraft et al. | |
| 4,706,512 A | 11/1987 | McKernon et al. | |
| 4,721,013 A | 1/1988 | Stuer et al. | |
| 4,817,773 A | 4/1989 | Knodel et al. | |
| 5,355,743 A | 10/1994 | Tesar | |
| 5,880,964 A * | 3/1999 | Schall .................. | A61F 2/5046 623/27 |
| 5,908,372 A | 6/1999 | Janek | |
| 6,791,215 B2 | 9/2004 | Tesar | |
| 7,081,062 B2 | 7/2006 | Tesar | |
| 7,122,926 B2 | 10/2006 | Tesar | |
| 7,431,676 B2 | 10/2008 | Tesar | |
| 7,604,559 B2 | 10/2009 | Fujimoto et al. | |
| 7,722,494 B2 | 5/2010 | Tesar | |
| 8,033,942 B2 | 10/2011 | Tesar | |
| 8,403,789 B2 | 3/2013 | Janek | |
| 8,516,918 B2 * | 8/2013 | Jacobsen .................. | A61F 2/68 74/490.01 |
| 9,956,093 B1 * | 5/2018 | Harris ....................... | A61F 2/60 |
| 2004/0007923 A1 | 1/2004 | Tesar | |
| 2004/0102274 A1 | 5/2004 | Tesar | |
| 2004/0103742 A1 | 6/2004 | Tesar | |
| 2005/0168084 A1 | 8/2005 | Tesar | |
| 2007/0168081 A1 | 7/2007 | Shin et al. | |
| 2007/0249457 A1 | 10/2007 | Tesar | |
| 2008/0257088 A1 * | 10/2008 | Tesar ....................... | F16H 1/28 74/438 |
| 2008/0269922 A1 | 10/2008 | Tesar | |
| 2009/0075771 A1 | 3/2009 | Tesar | |
| 2012/0088622 A1 | 4/2012 | Tesar | |
| 2012/0204671 A1 | 8/2012 | Tesar | |
| 2012/0215450 A1 | 8/2012 | Ashok et al. | |
| 2013/0023373 A1 | 1/2013 | Janek | |
| 2013/0217530 A1 | 8/2013 | Tesar | |
| 2014/0224064 A1 | 8/2014 | Tesar | |
| 2014/0228162 A1 | 8/2014 | Tesar | |
| 2014/0246893 A1 * | 9/2014 | Tesar .................. | B60K 7/0007 301/6.5 |
| 2015/0102655 A1 | 4/2015 | Tesar | |
| 2015/0292601 A1 | 10/2015 | Tesar | |
| 2015/0330455 A1 | 11/2015 | Tesar | |
| 2015/0351938 A1 | 12/2015 | Moser et al. | |
| 2015/0354667 A1 | 12/2015 | Tesar | |
| 2015/0374573 A1 | 12/2015 | Horst | |
| 2016/0030202 A1 | 2/2016 | Nishikawa | |
| 2016/0030272 A1 | 2/2016 | Angold | |
| 2016/0067058 A1 | 3/2016 | Herr | |
| 2016/0074182 A1 | 3/2016 | Celebi | |
| 2016/0091054 A1 | 3/2016 | Tesar | |
| 2016/0095720 A1 | 4/2016 | Behzadi | |
| 2016/0113831 A1 | 4/2016 | Hollander | |
| 2016/0137051 A1 | 5/2016 | Tesar | |
| 2016/0138679 A1 | 5/2016 | Tesar | |

OTHER PUBLICATIONS

T. Ménard, G. Grioli and A. Bicchi, "A real time robust observer for an Agonist-Antagonist Variable Stiffness Actuator", Robotics and Automation (ICRA), 2013 IEEE International Conference (Karlsruhe, May 6-10, 2013).

Giorgio Carpino, Dino Accoto, Fabrizio Sergi, Nevio Luigi Tagliamonte and Eugenio Guglielmelli, "A Novel Compact Torsional Spring for Series Elastic Actuators for Assistive Wearable Robots", J. Mech. Des 134(12), 121002 (Oct. 19, 2012).

Matteo Laffranchi, Hide Sumioka, Alexander Sproewitz, Dongming Gan, Nikos G. Tsagarakis, "Compliant Actuators, Adaptive Modular Architectures for Rich Motor Skills (AMARSi)", ICT-248311 D2.1 (Mar. 2011).

Gill A. Pratt and Matthew M. Williamson, "Series Elastic Actuators", IEEE, 399-406 (1995).

Matthew M. Williamson, "Series Elastic Actuators", Masters Thesis, Department of Electrical Engineering and Computer Science, Massachusetts Institute of Technology (Feb. 1995).

Micromotion, Product Catalog, "Precision Microactuators", downloaded Jan. 16, 2015 from http://www.orlin.co.uk/PDFs/Micromotion_product_brochure.pdf.

Schaeffler KG, Linear technology Division, "Miniature Linear Actuator with Toothed Belt Drive", Series MLFI20-ZR (Jan. 2006).

Nicholas Paine, "Design and Control Considerations for High-Performance Series Elastic Actuators", IEEE/ASME Transactions on Mechatronics, 1-11 (2013).

D.F.B. Haeufle, M.D. Taylor, S. Schmitt, H. Geyer, "A clutched parallel elastic actuator concept:towards energy efficient powered legs in prosthetics and robotics", 2012 4th IEEE RAS & EMBS International Conference on Biomedical Robotics and Biomechatronics (BioRob) (Rome, Jun. 24-27, 2012).

Markus Baeuml, Florian Dobre, Harald Hochmuth, Manfred Kraus, Hartmut Krehmer, Roland Langer, Dominik Reif, "The Chassis of the Future", The Schaeffler Symposium Book (Schaeffler Technologies AG & Co. KG, 2014).

Fabrizio Sergi, Melissa M. Lee, and Marcia K. O'Malley, "Design of a series elastic actuator for a compliant parallel wrist rehabilitation robot", 2013 IEEE International Conference on Rehabilitation Robotics, pp. 1-6 (Seattle, WA, Jun. 24-26, 2013).

Sidharth Iyer, "Modeling and Testing of a Series Elastic Actuator with Controllable Damping", Master's Thesis, Worcester Polytechnic Institute (Jan. 2012).

(56) References Cited

OTHER PUBLICATIONS

Agostino De Santis, Bruno Siciliano, Alessandro De Luca, Antonio Bicchi, "An atlas of physical human-robot interaction", Mech. Mach. Theory (2007).

Michael David Taylor, "A Compact Series Elastic Actuator for Bipedal Robots with Human-Like Dynamic Performance", Master's Thesis, Robotics Institute, Carnegie Mellon University (Aug. 2011).

* cited by examiner

ACTUATORS FOR PATIENT MOBILITY DEVICES, PATIENT HEALTHCARE DEVICES AND HUMAN PROSTHETICS

CROSS-REFERENCE TO RELATED APPLICATION

This application claims the benefit of priority of U.S. provisional application No. 62/430,916, filed Dec. 6, 2016, having the same inventor and the same title, and which is incorporated herein by reference in its entirety.

FIELD OF THE DISCLOSURE

The present disclosure relates generally to mechanical actuators and devices incorporating the same, and more particularly to patient mobility devices which feature active response actuators.

BACKGROUND OF THE DISCLOSURE

Mobility impaired individuals frequently require assistance in moving from one location to another. Traditionally, this need has been met with the ubiquitous wheelchair. However, wheelchairs require certain minimum areas for operation. For example, in a hospital setting, sufficient space must be set aside in a room to allow a patient to move from a bed to a wheel chair to a doorway. This space must typically account for the fact that a wheelchair usually requires a certain minimum area to execute turns. Unfortunately, hospital space is typically at a premium. It is thus desirable to minimize the amount of space required to accommodate a wheelchair.

Other individuals, such as amputees, suffer loss of functionality. Various prosthetic devices have been developed in the art to restore some of functionality to these individuals. Some of these devices are depicted in FIGS. 14-15.

SUMMARY OF THE DISCLOSURE

Figure 1:
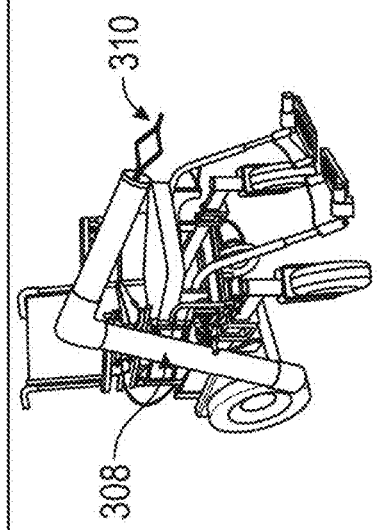
FIG. 1 is a listing of some powered wheelchair systems which are known to the art.
Figure 1:
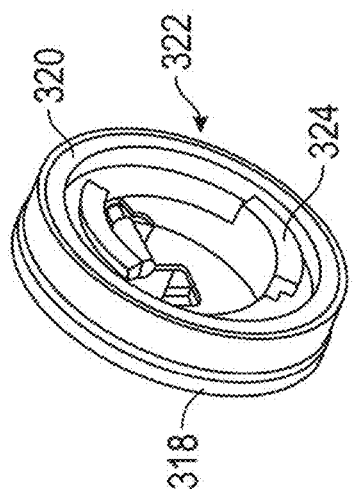
Figure 1:
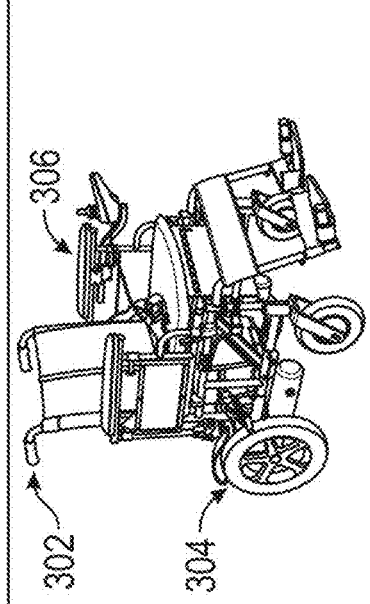
Figure 1:
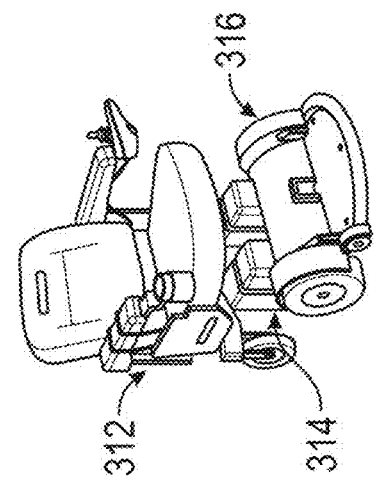

In one aspect, a robotic bed is provided which comprises (a) a bed frame supported on a set of wheels; (b) a mattress supported on said bed frame, said mattress having first and second opposing sides; (c) first and second opposing rails disposed parallel to said first and second opposing sides of said bed; (d) first and second rollers disposed on said first and second rails, respectfully; (e) a sheet which extends between said first and second rollers, said sheet having opposing end portions which are wrapped around said first and second rollers, respectively; and a first set of actuators which rotate said first and second rollers.

In another aspect, an orthotic device is provided which comprises (a) a first structural element; (b) a second structural element which is rotatably attached to the first structural element across a joint; (c) a first rotary actuator which imparts rotational motion to the first structural element relative to the second structural element about a first axis; and (d) a second rotary actuator which imparts rotational motion to the first structural element relative to the second structural element about a second axis; wherein each of said first and second rotary actuators is selected from the group consisting of parallel eccentric actuators and rotary actuators.

In a further aspect, an orthotic device is provided which comprises (a) a first structural element; (b) a joint attached to said first structural element; and (c) a first actuator which rotates said first structural element about an axis centered on said joint; wherein said first actuator is selected from the group consisting of parallel eccentric actuators and star compound actuators.

In still another aspect, an orthotic device is provided which comprises (a) a first structural element; (b) a second structural element attached to said first structural element by way of a joint; and (c) a first actuator which moves said first structural element relative to said second structural element; wherein said first actuator is selected from the group consisting of parallel eccentric actuators and star compound actuators.

In yet another aspect, an orthotic device is provided which comprises (a) a first structural element; (b) a second structural element attached to said first structural element by way of a joint; and (c) a first actuator which moves said first structural element relative to said second structural element; wherein said first actuator includes (1) an internal gear, (2) first and second parallel eccentric gears which mesh with said internal gear; (3) a crankshaft equipped with first and second eccentrics which are 180° out-of-phase and which drive said first and second parallel eccentric gears, respectively, (4) a prime mover which drives said crankshaft, (5) first and second crosslinks which prevent the rotation of said first and second parallel eccentric gears, respectively, and (6)

first and second sets of splines which engage said first and second parallel eccentric gears, respectively.

In still another aspect, an orthotic device is provided which comprises (a) a first structural element; (b) a second structural element attached to said first structural element by way of a joint; (c) a link disposed about said joint, said link terminating in a first receptacle on a first end thereof, and terminating in a second receptacle on a second end thereof; (d) first and second actuators disposed in said first and second receptacles, respectively; (e) a first brace terminating in a third receptacle on a first end thereof, and attached to said first structural element on a second end thereof; and (f) a second brace terminating in a fourth receptacle on a first end thereof, and attached to said second structural element on a second end thereof; wherein said first actuator is disposed in a container formed by said first and third receptacles, and said second actuator is disposed in a container formed by said second and fourth receptacles.

In another aspect, an orthotic device is provided which comprises (a) a first structural element; (b) a second structural element; (c) a first link attached on a first end thereof to said first structural element, and terminating in a first receptacle on a second end thereof; (d) a second link attached on a first end thereof to said second structural element, and terminating in a second receptacle on a second end thereof; and (e) a first actuator disposed in a container formed by said first and second receptacles.

In still another aspect, a mobile assist platform is provided which comprises (a) a platform including a frame supported on a set of wheels, and a center portion which is rotatable with respect to said frame; (b) a chair attached to said center portion of said platform; (c) a steering column, disposed on said center portion of said platform and adjacent to said chair, which steers at least one of said set of wheels; and (d) a set of guide arms disposed adjacent to said chair; wherein each of said guide arms includes first and second arm segments, and is equipped with at least one rotary actuator which moves said first arm segment relative to said second arm segment.

In yet another aspect, a combination is provided which includes an orthotic device and a pancake actuator which imparts motion to the orthotic device. The pancake actuator comprises (a) a frame and a plate disposed in opposing relation to each other; (b) a stator disposed between said frame and said plate; (c) a rotor disk equipped with a rotor and disposed within said stator such that said rotor is adjacent to said stator; (d) a pinion gear; and (e) first and second star gears disposed between said frame and said plate, wherein each of said first and second star gears meshes with said pinion gear and said frame.

DETAILED DESCRIPTION

The need spectrum of patients requiring mobility assistance is broad, and is summarized in TABLE 1 below.

TABLE 1

| U.S. Human Rehabilitation Needs |
| --- |
| I. COSTS EXPECTED TO RISE (2002) |
|    11.5% Severely Disabled |
|      32.5 million |
|    3.8% Need ADL Assistance |
|      10.7 million |
|    Trauma Brain Injury |
|      5.3 million |
| II. ASSOCIATED COSTS |

TABLE 1-continued

| U.S. Human Rehabilitation Needs |
| --- |
|    1998 Cost of Nursing Facilities |
|      $7.85 billion |
|    2006 Orthopedic Equipment |
|      $8.8 billion |
|    Spinal Implants |
|      38% of Orthopedic Equipment |
| III. Need for Prosthetics |
|    1.9 million U.S. Amputees |
|      Primarily Due to Diabetes |
|    600 Are From Iraq |
|      Half Are Arm Amputees |
|    30,000 Amputees/Civil War |
|      Burst in Prosthetics Tech |
|    $900 million Prosthetics Mkt. |
|      Outside U.S. Supplier |
|      75% Are Leg Amputees |
| IV. DARPA PROSTHETICS PROGRAM |
|    Concentration on Arm |
|      Up to 24 DOF |
|      Exceptionally Complex |
|    $100 Million Effort |
|      Medical Dev. Team |
|      One Indus. Team |
|    Wish To Use Myo-Electronics |
|      Unproven Technology |
|      Unlikely To Proceed |

Figure 2:
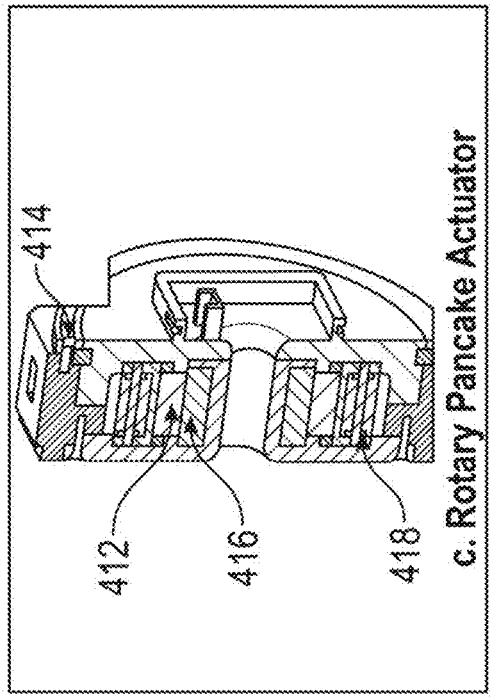
FIG. 2 is an illustration of wheelchair and manipulator platforms and actuators which afford high performance-to-cost ratios.
Figure 2:
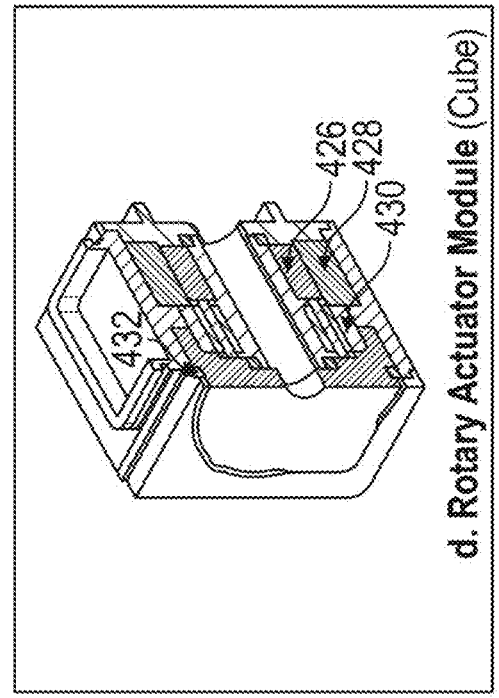
Figure 2:
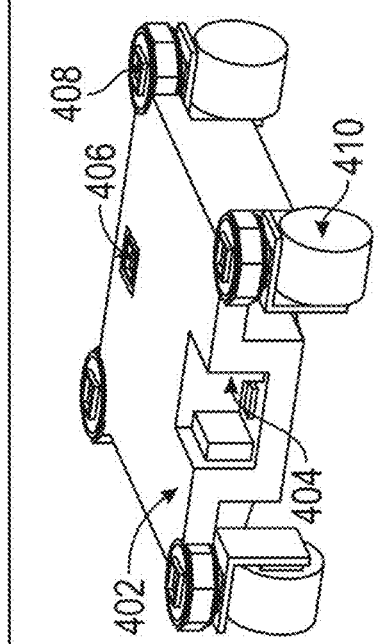
Figure 2:
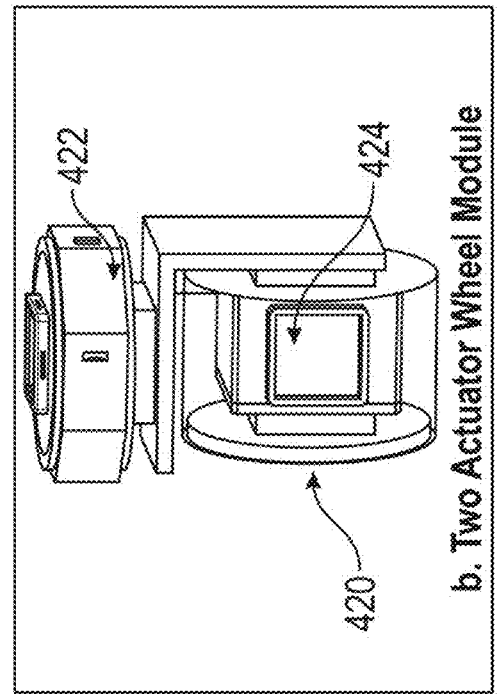
Figure 4:
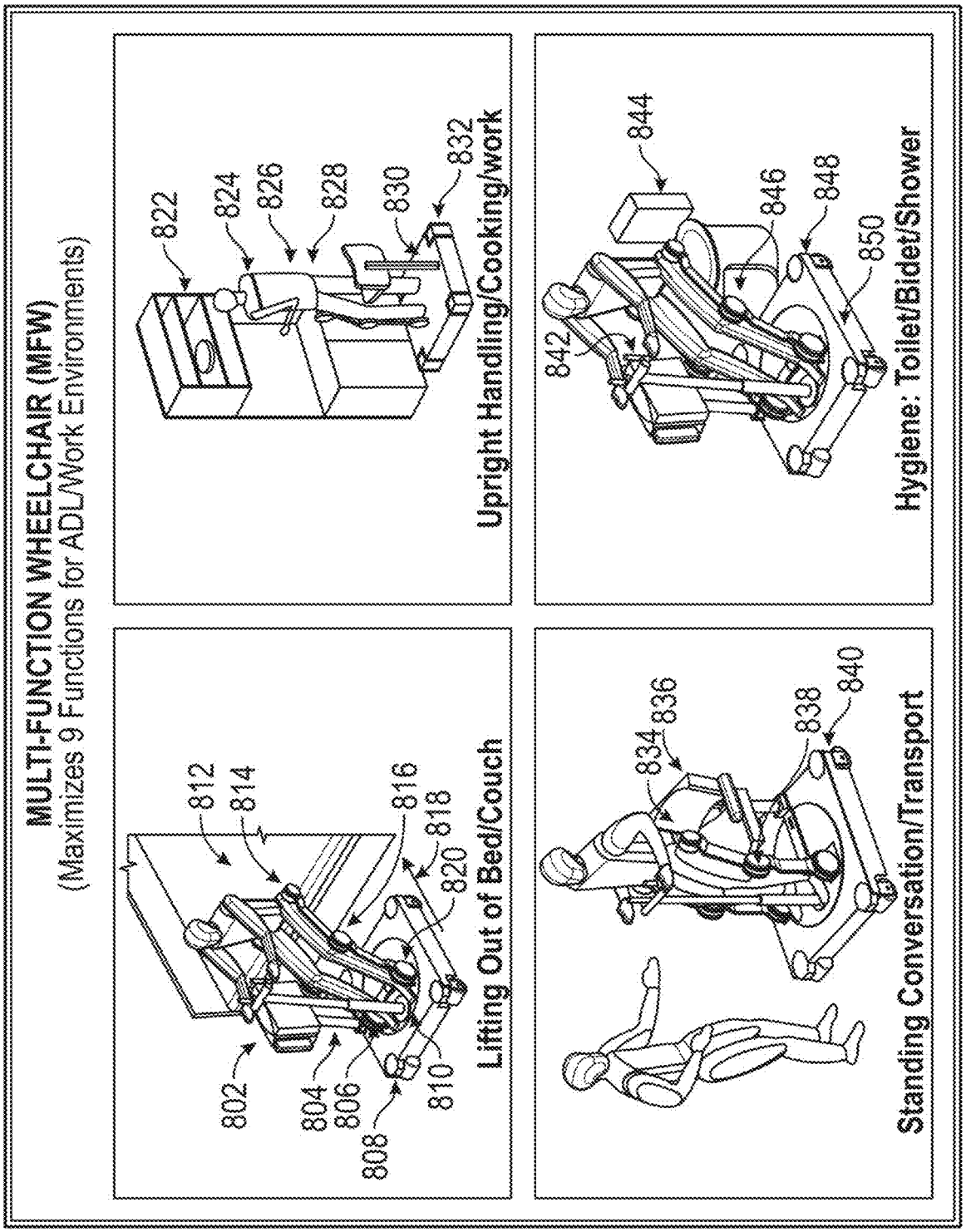
FIG. 4 is a series of illustrations depicting the functionality of a particular, non-limiting embodiment of a multi-function wheelchair (MFW) in accordance with the teachings herein.
Figure 5:
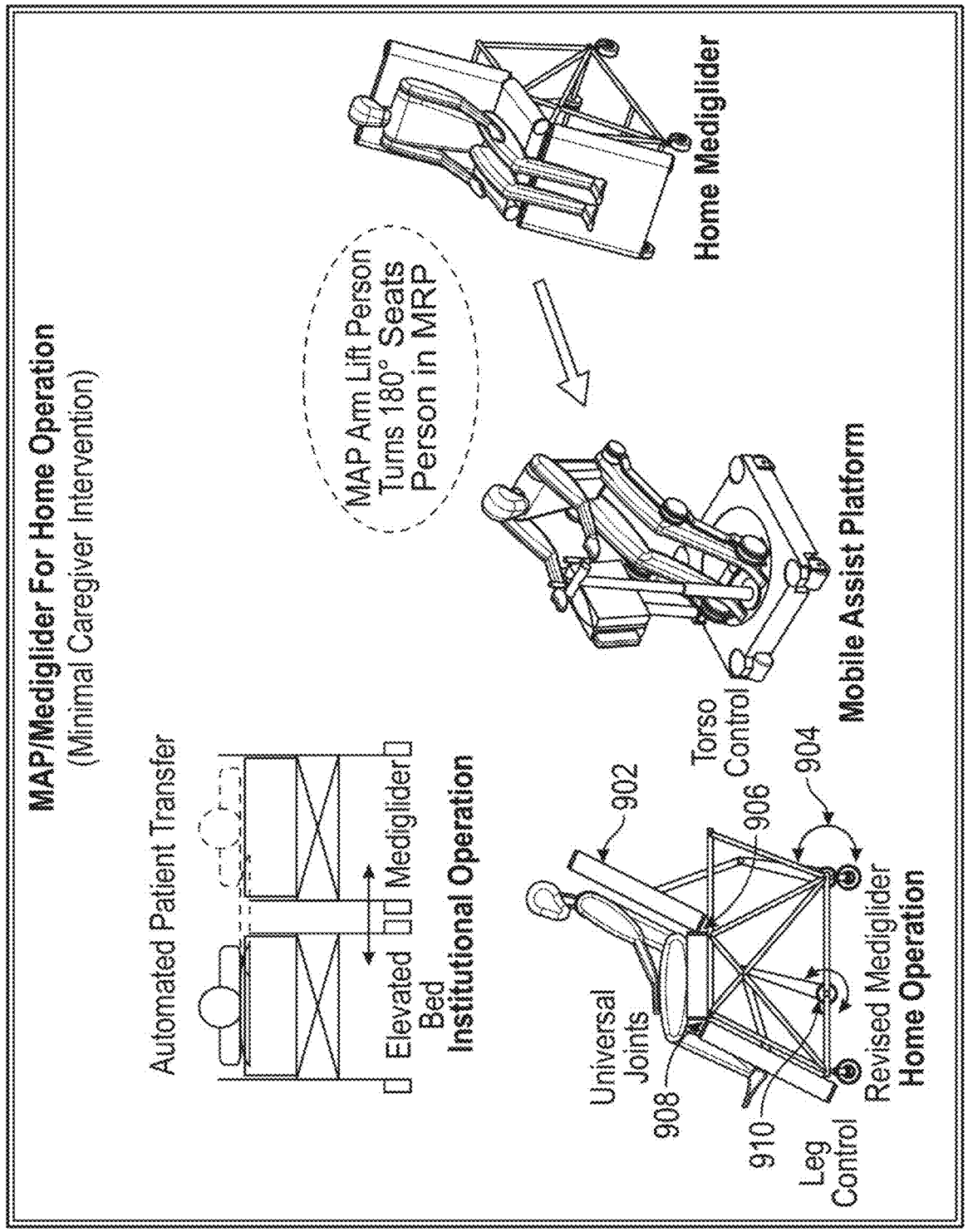
FIG. 5 is a series of illustrations depicting the functionality of a particular, non-limiting embodiment of a multi-function bed and MAP in accordance with the teachings herein.
Figure 6:
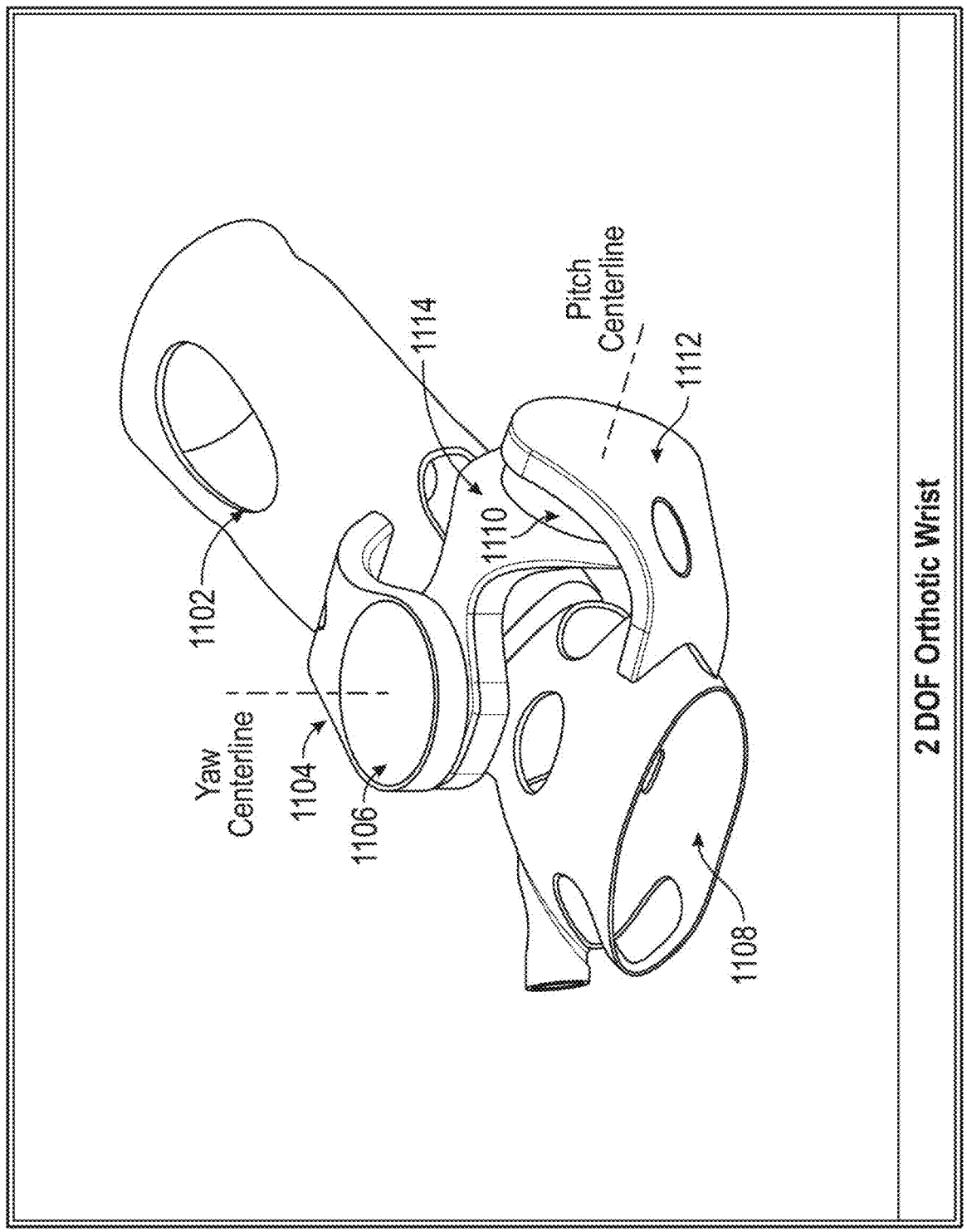
FIG. 6 is a perspective view of a particular, non-limiting embodiment of an orthotic wrist in accordance with the teachings herein which has 2 degrees of freedom.
Figure 7:
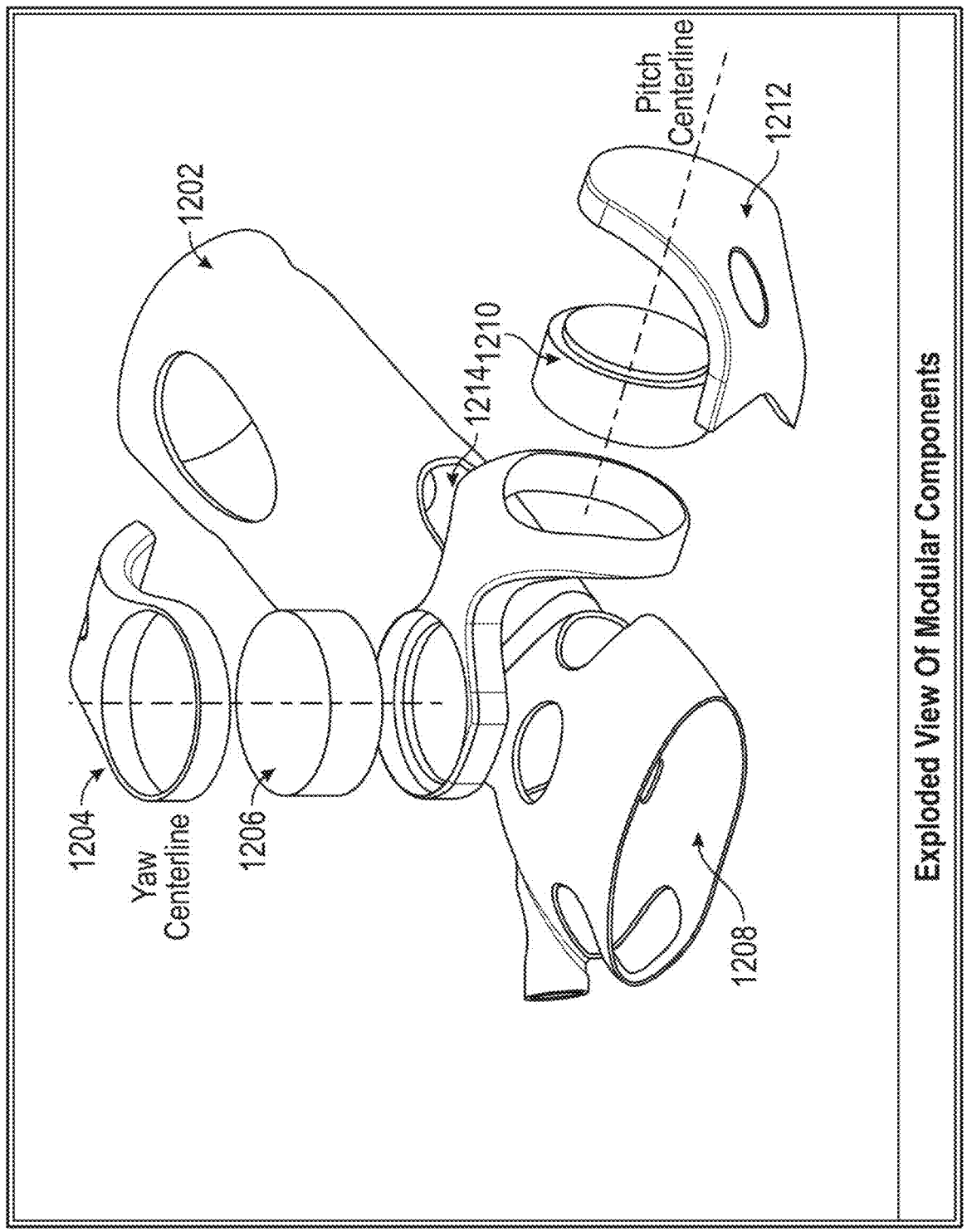
FIG. 7 is an exploded view of the orthotic device of FIG. 6.
Figure 8:
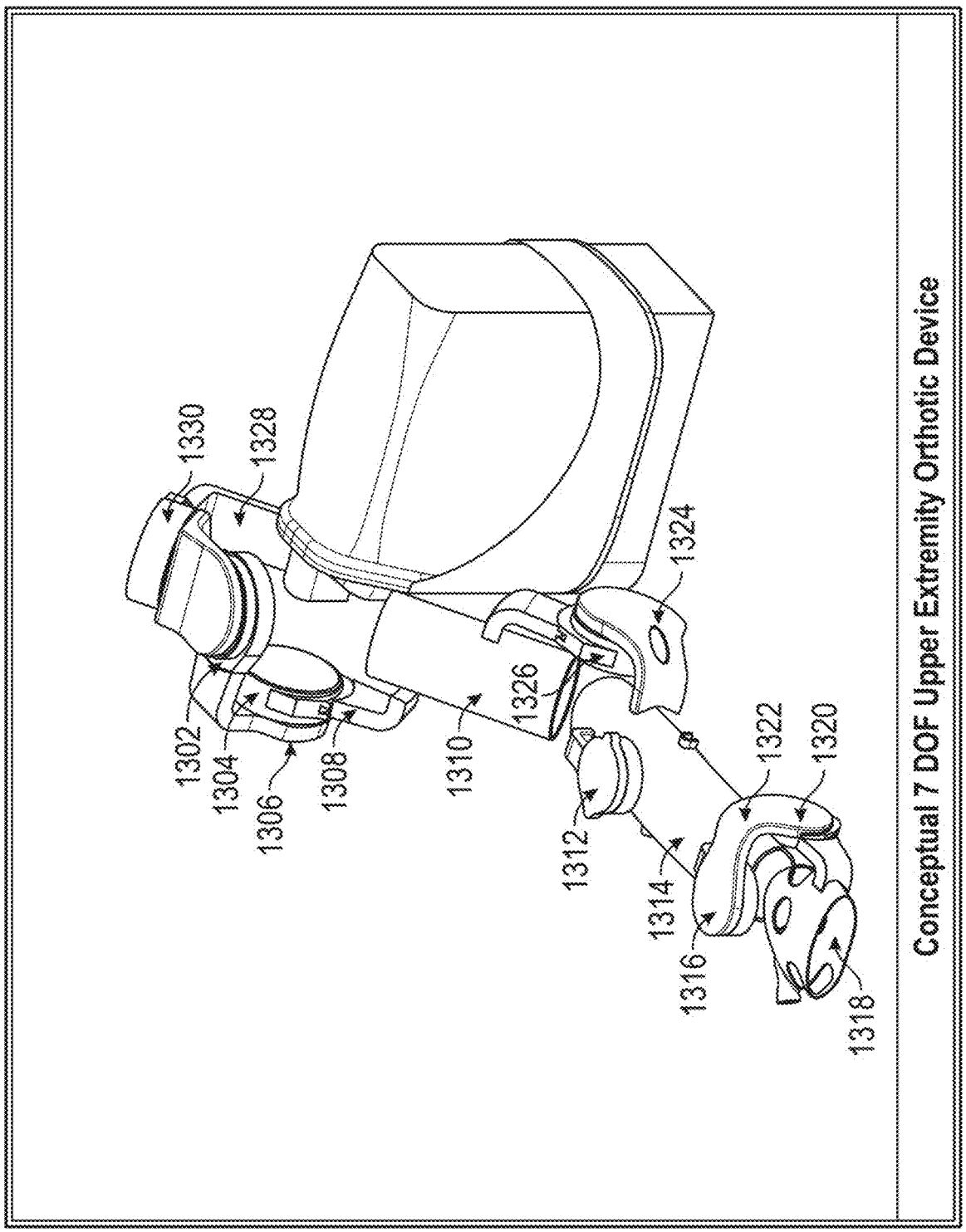
FIG. 8 is a perspective view of a particular, non-limiting embodiment of an upper extremity orthotic device in accordance with the teachings herein which has 7 degrees of freedom.
Figure 9:
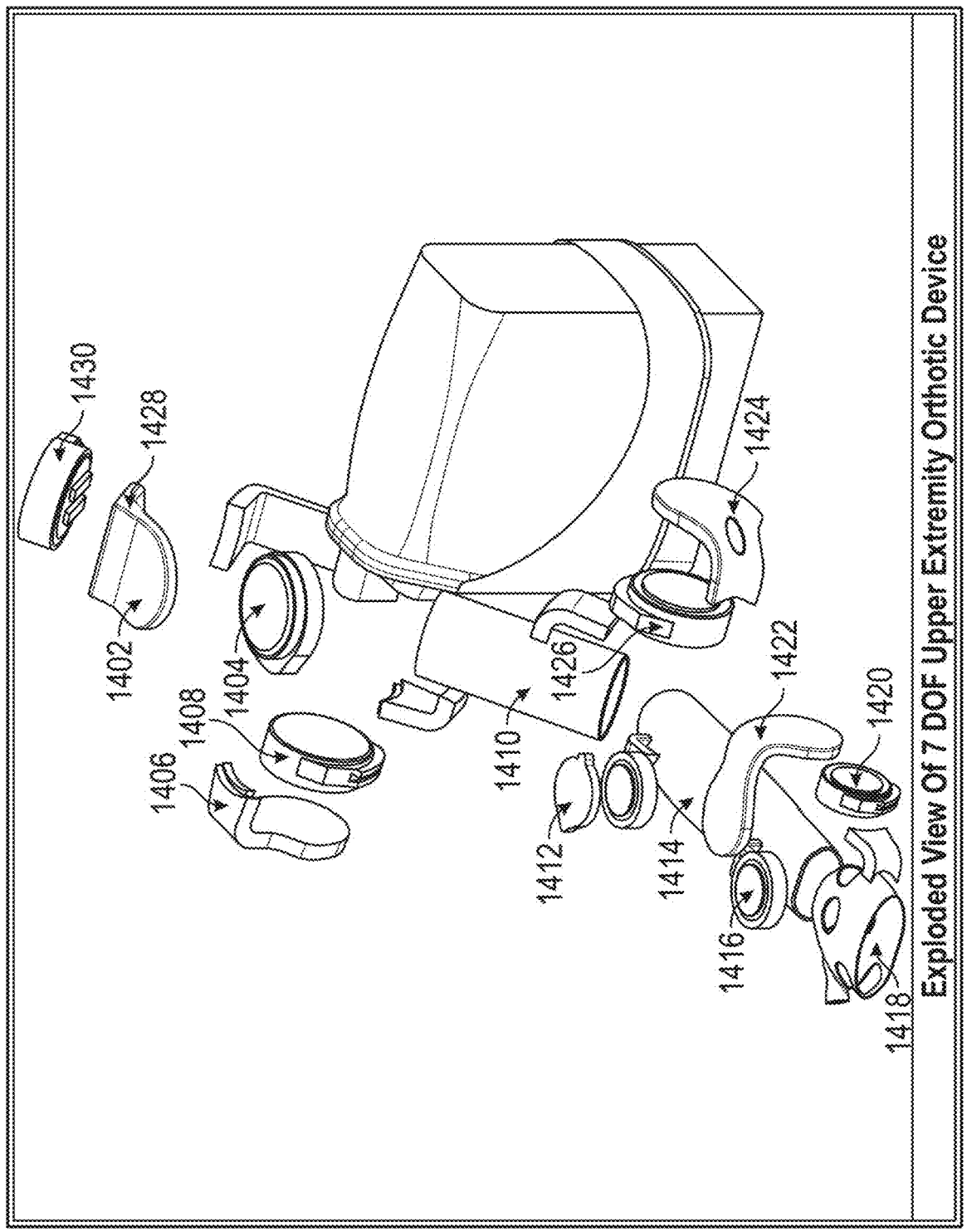
FIG. 9 is an exploded view of the device of FIG. 8.
Figure 10:
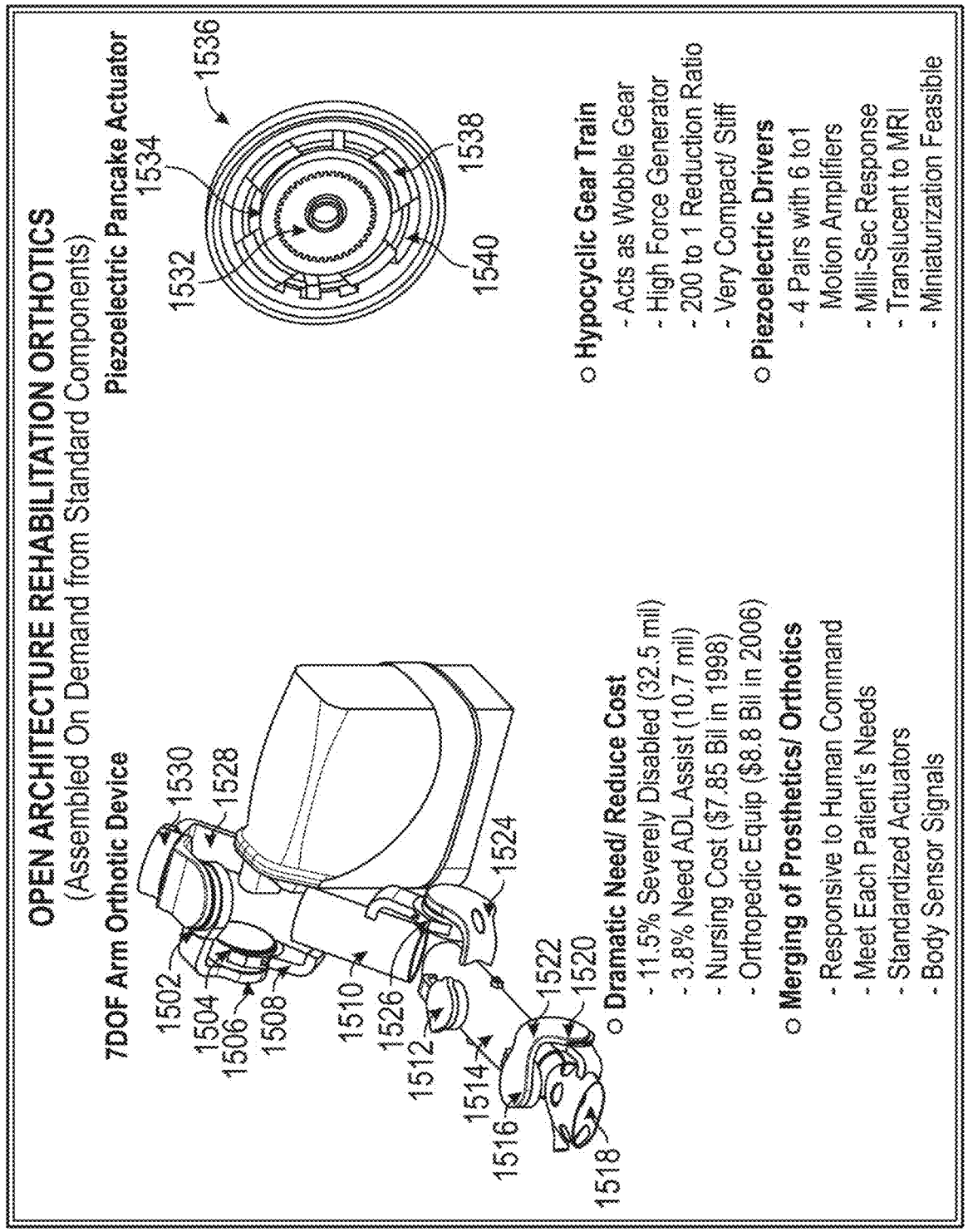
FIG. 10 is a listing of some features of the device of FIG. 8.

The development of a first generation of patient assist devices is summarized in TABLES 2-3 below, and some of the devices and components resulting from this development effort are depicted in FIGS. 1-2. The development of a second generation of patient assist devices is summarized in TABLE 4 below, and some of the devices and components resulting from this development effort are depicted in FIGS. 4-5. TABLE 5 lists some of the features required in rehabilitation technology, while TABLES 6-8 lists some of the goals for an open architecture orthotics system.

TABLE 2

| MODULAR ROBOTIC WHEELCHAIR (MRW) MANIPULATOR DEVELOPMENT |
| --- |
| 1. MODERNIZE WHEELCHAIR |
|    Expand Functionality |
|      Powered Platform |
|      Dexterous Manipulator |
|      Automatic Tool |
|      Interchange |
|    Open Architecture |
|      Plug-and-Play |
|      High Performance/Low Cost |
|      Certified Components |
|      Actuators/Controllers |
|      Wheelchair Specific SFW |
| 2. WHEELCHAIR MATCHES INDIVIDUAL |
|    Person Specific Components |
|    Man-Machine Interface |
|    Library of Tools |
|    Operating Systems |
|    Pre-Planned Motions |
| 3. MINIMUM SET OF COMPONENTS |
|    Standardization Reduces Cost |
|      Responsive Supply Chain |
|      10x Comp. Cost reduction |
|      5x Comp. Weight Reduction |
|    Maximum Solution Population |
|      Increase Actuator Use |
|      Expands Functionality |
|      More Supervised Automation |
| 4. DEXTEROUS 8 DOF PLATFORM |
|    4 Steered/powered Wheels |

TABLE 2-continued

MODULAR ROBOTIC WHEELCHAIR
(MRW) MANIPULATOR DEVELOPMENT

Moves Any Direction
    Improved Fault Tolerance
  5. DEXTEROUS 6 DOF MANIPULATOR
    Duplicates Arm Function
      Eating/Handling
      Use Commercial if Possible

TABLE 3

MODULAR ROBOTIC PLATFORM
(MRW) & MANIPULATOR DEVELOPMENT
(First Generation Open Architecture Assist System)

1. MODERNIZE ASSIST
  SYSTEM
    Expand Functionality
      Powered Platform
      Dexterous Manipulator
      Automatic Tool
      Interchange
    Open Architecture
      Plug-and-Play
      High Performance/Low
    Cost
      Certified Components
      Actuators/Controllers
      Wheelchair Specific SFW
  2. MAP MATCHES INDIVIDUAL
    Person Specific Components
    Man-Machine Interface
    Library of Tools
    Operating Systems
    Pre-Planned Motions
  3. MINIMUM SET OF COMPONENTS
    Standardization Reduces Cost
      Responsive Supply Chain
      10x Comp. Cost reduction
      5x Comp. Weight Reduction
    Maximum Solution Population
      Increase Actuator Use
      Expands Functionality
      More Supervised Automation
  4. DEXTEROUS 8 DOF PLATFORM
    4 Steered/powered Wheels
      Moves Any Direction
      Improved Fault Tolerance
  5. DEXTEROUS 6 DOF MANIPULATOR
    Duplicates Arm Function
      Eating/Handling
      Use Commercial if Possible

TABLE 4

ROBOTIC MULTI-FUNCTION
WHEELCHAIR (MFW)
(Second Generation Wheelchair/
High Function Density)

1. EXPANDED FUNCTIONS
    Dexterous Mobility
      Seated/Standing
      ±180° Turning
    Orthotics
      Leg/Arm Rehab
      Complex Handling
  2. MFW CAPABILITY
    Four 2 DOF Wheels
      Translation/Rotation
      Extend Front Wheels (18")
      Platform Stability
    Platform Trunion
      Rotates Occupant TABLE 4-continued ROBOTIC MULTI-FUNCTION
WHEELCHAIR (MFW)
(Second Generation Wheelchair/
High Function Density)

Seated or Standing
      Provides Shoe Sockets
    Platform Seat
      Latches to Trunion
      Pivots About Center
      Support Roller on Platform
    Lifting Guide Arms
      Two Parallel Arms
      2 or 3 Actuators
      Pancake Star Compounds
      Lifts/Controls Torso
      Attached To Trunion
      Quick-Change Attachments
    Orthotic Arm Support
      Attaches to Upper Torso
      3 up to 7 DOF
      Complex Handling Motions
      Rehabs Weakened Arm

TABLE 5

REQUIRED REHABILITATION TECHNOLOGY

I. OPEN ARCH. EXOSKELETON
    Strengthen Weakened Patient
      Brain/Muscle Coordination
    Full Population of Disabled
      Arms, Legs, Torso, Etc.
    Target Is ADL
      Reduce Clinical Time
      Maximize Availability
      Reduce Cost
      Improve Reliability
  II. PLUG-AND-PLAY SYSTEM
    Standardized Components
      Actuators, Links
      Controllers, Sensors
      Multiple Suppliers
    Customized Body
    Attachments
      Use Laser Sintering
    Assemble On Demand
      By Clinician
      Repair By Patient
  III. MERGING OF PROSTHETICS/
  ORTHOTICS
    Responsive To Human Command
      Safety/Backdrivability
      Required for ADL
    Standardized Actuators
      Low Weight/High Torque
      Perhaps 5 Required
      Drives Down Cost
    Meet Each Patient's Needs
      Analysis By Clinician
      Wireless In ADL
      Real Time Performance Feedback
  IV. SENSOR-BASED
  UNDERGARMENTS
    Torso Undergarment
      Arm Prostheses
      Six Coordinate Signals Feasible
    Pelvic Undergarment
      Leg Prostheses
    Natural Signal Generation
      Reliable/Bilateral
      Under Patient's Control
      Temp., Pressure, Tension, Torsion

TABLE 6

GOALS FOR OPEN ARCHITECTURE ORTHOTICS (part 1)

| Development Task | Technical Issues | Goals |
|---|---|---|
| 1. Intelligent Actuators | High Torque, Low Volume, Low Weight, Low Noise Fits Under Normal Clothing | Knee/Hip/Ankle Peak Torque 200 ft-lb. in 2.5" W. × 3.5" Dia. |
| 2. Durability | Equivalent to Car, Low Cost, No Backlash, Predict Failure, Maintainable by Caregiver | 5000-hour Life Reduce Cost by 5x |
| 3. Minimum Sets | Plug-and-Play Interfaces, All Components, Link Composites, Continuous Performance/Cost Improvement | 5 Actuator Size, 3 Actuator Classes, Quick-Changeout, Low Weight |
| 4. Responsiveness | Almost No Gear Train Inertia, Exceptional Stiffness, Low Lost Motion, Precision Control | Similar to BLDC Without Gearing |

TABLE 7

GOALS FOR OPEN ARCHITECTURE ORTHOTICS (part 2)

| Development Task | Technical Issues | Goals |
|---|---|---|
| High Efficiency | Embedded Performance Maps, Operate Near sweet Spots, 10 Internal sensors, Real-Time Efficiency Mgmt. | 40 Embedded Maps, Efficiency Up 4x, Temperature Mgmt. |
| Distributed Body Sensors | On-Link Structures, Body Sockets, Undergarments, Monitor Body Functions | Up to 25 Operational regimes, Selected By Patient On Command |
| Operational Criteria | Patient Duty Cycles, Archive Operational data, Choose/Rank All criteria | Develop 30 to 50 Criteria, Patient learning Regimes |

TABLE 8

GOALS FOR OPEN ARCHITECTURE ORTHOTICS (part 3)

| Development Task | Technical Issues | Goals |
|---|---|---|
| Operational Software | Use OSCAR Language, Software Evolves, Object-Oriented Structure | Full Model Parameters, 5 Milli/Second Computational Cycle |
| Configuration Manager | Assists Clinician To Assemble Best Patient Orthotic System, Continuous Management to Revise Configuration | Duty Cycle Measures, Continuous Updates, Visually Confirm With Performance Maps |
| Home Rehab. & Activities pf Daily Living (ADL) | Move Patient Quickly Out of Clinic, Reduce Cost, Telepresence With Clinic, Enable Quick Repair | Cost-Effective Components/System Technology, Patient Independent of Clinic |

A system architecture for a patient assist device is preferably responsive and reconfigurable to match as many real physical motion needs as possible, and to permit response to changes in those needs. This may require an open architecture which preferably involves low cost actuators and operating software (OS). The low cost actuators utilized in such an architecture are preferably standardized, plug-and-play, and highly-certified in a minimum set for mass production for all feasible systems. The operating software is preferably an open software architecture that permits constant up-dates to control a very large range of systems from 3 up to 20 DOF under human command.

Fortunately, a suitable OS system is widely available in the form of the OSCAR (Operating Software Components for Advanced Robotics) operating system developed at the University of Texas, and the ROS (Robot Operating System) operating system developed by the Southwestern Research Institute (SwRI) in San Antonio, Tex. These operating systems require specialization for the assist operating environment. The actuator, however, is well understood from a design environment, but should be prototyped, tested, certified, and detailed to enable mass production at the lowest possible cost. Given the OS and the minimum set of actuators (say, 5 to 10), it then becomes possible for nominally-trained personnel to meet each assist need (with a configuration manager) and to enable the caregiver to maintain the system to provide maximum availability.

Systems are disclosed herein which are plug-and-play systems that utilize a minimum set of highly-certified, low cost actuators matched by a similar selection of operational software components. Preferred embodiments of these systems are based on the components in TABLE 9 below:

TABLE 9

System Components

| Component | Description |
|---|---|
| MediGlider | Drive with four 2 DOF corner actuator modules, automated motion plan, automated patient bed pick-up and return, provide for full hospital integration. |
| Roll-Bed | Provide a bed-oriented patient roll module to automate patient commanded roll in either direction, keeping patient centered on mattress. |
| Glider 1 | Very simple domestic motion platform for the incapacitated young with complete motion command by the patient. |
| Glider 2 | Generalized domestic/workplace motion platform under adult patient command with carrying capacity from 200, 250, 300 lb. total. |
| Glider 3 | Augment Glider 2 to permit total life capability of nine functions in structured environments from morning to night. |
| Orthotics | Produce the Ekso Bionics and Suitx Phoenix leg orthosis to expand to full body orthotics. |

Figure 3:
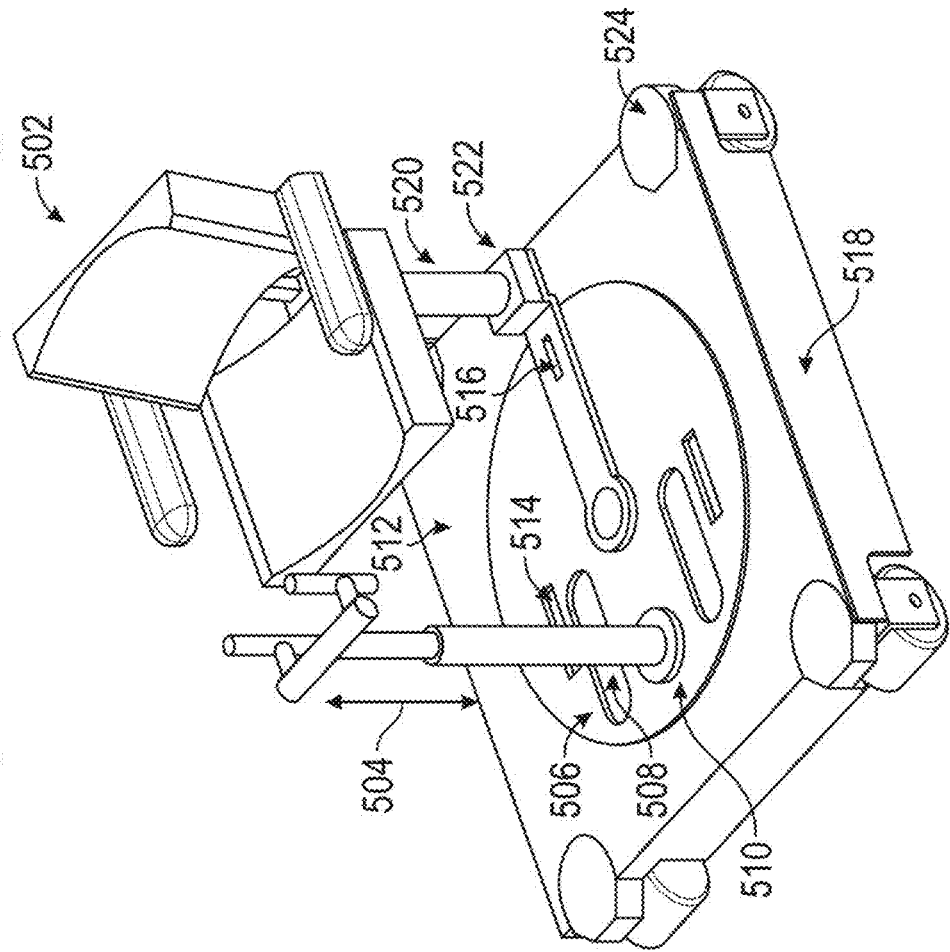
FIG. 3 is a perspective view of a particular, non-limiting embodiment of a mobile assist platform (MAP) in accordance with the teachings herein.

FIG. 3 depicts a particular, non-limiting embodiment of a mobile assist platform (MAP) in accordance with the teachings herein, and TABLE 10 lists some features of the associated MAP-based operations. The MAP 501 depicted in FIG. 3 includes a seat 503 mounted on a rotatatable trunnion 505. The MAP 501 is equipped with wheels 507 which are preferably powered by star compound gears, and which preferably offer 2 degree of freedom (DOF) dexterous operation. Preferably, these wheels 507 may be independently controlled by the operator (preferably through suitable software) to provide movement in any direction. The wheels 507 are preferably rotatable over a wide angular range to impart movement in any desired direction. The rotating trunnion 505 is preferably manipulated by a tension belt powered by a star compound gear train.

The particular embodiment of the MAP 501 depicted further comprises an extensible hand pedestal 511, a guide arm attachment 513, a foot socket 515, a hand grip pedestal 517, a bayonet lock 519, a folding arms and seat combination 521 which is configured to clear the hand grip pedestal 517, a seat pedestal 523, and a seat support roller 525. Though not shown, the depicted embodiment of the MAP 501 further comprises one or more batteries and controller circuitry.

TABLE 10

PATIENT PERFORMANCE MAP-BASED OPERATIONS
(Based On real Time Sensor Array Data Acquisition)

Figure 11:
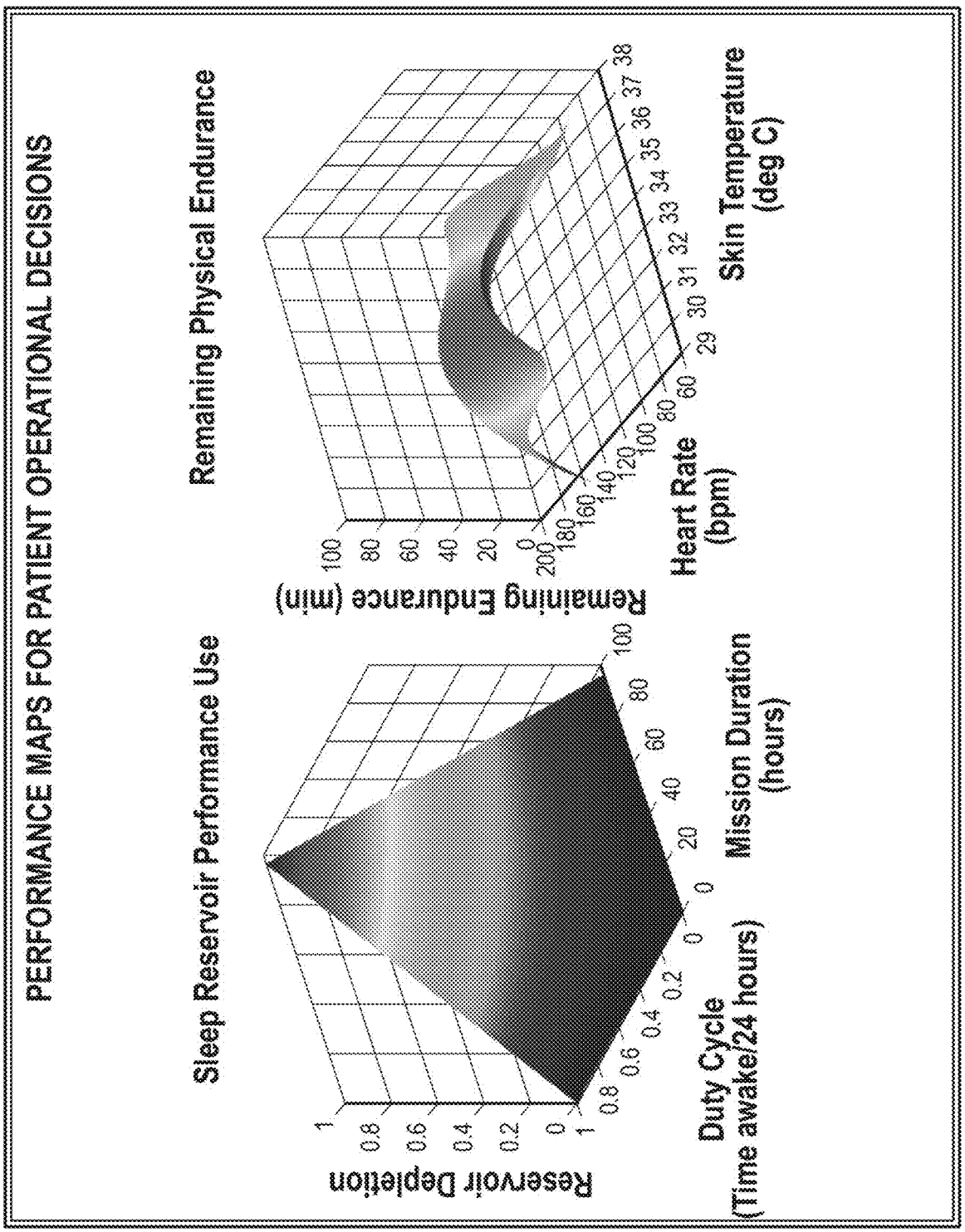
FIG. 11 is a collection of performance maps for patient operational decisions.

I. OVERALL OBJECTIVE
    Maximize Human Performance
        Wide Range of Operations
        Using Intelligent Systems
    Revolutionize Man/Machine
        Automated Mutual awareness
        Enhance Short-Term Actions
        Strengthen Mission Planning
    Improve Resource Utilization
        Full Access to Available
        Resources
        Fully Documented
        Operators/Equip.
        Under Ever-Changing Threats
II. CONCENTRATE ON THE PATIENT
    Identify 10 Patient Measures
        Endurance, Responsiveness,
        etc.
    Select 10 Patient Parameters
        Stress, Fatigue, Etc.
    Evaluate 10 Uniform Bio
    Markers
        Heartbeat, Brain EEG, Etc.
    Establish 10 System
    Measures
        Patient/System, Common
        Database
III. MAP/ENVELOPE CONSTRUCTION
    Patient/System Maps
        Two Parameters for Each Measure
        100(+) Patient Maps
        100(+) System Maps
    Patient/System Envelopes
        Combination of Maps
        Stress/Sleep/Food Envelope
        100's of Standard Envelopes
        Envelopes on Demand
    Similar Equipment Maps/Envelopes
IV. MAP/ENVELOPE UTILIZATION
    Mesh Patient/Equipment Maps
        Automated Matching
        Maximizes Overall Performance
    Improves Patient Awareness
        Patient Awareness
        Rapid Operator Replacements
    Improves Clinician Interface
        Clinician resource Awareness (±)
        Automated Treatment Planning FIG. 11 depicts two particular, non-limiting examples of performance maps (here, for patient operational decisions) of the type that may be developed for a particular person. Such performs maps depict the intelligence of the decision making which may be built into the devices and systems described herein to compensate for the physical infirmities of the patient. The leftmost performance map depicted in FIG. 11 depicts sleep reservoir performance use in the form of reservoir depletion as a function of duty cycle (time awake/24 hours) and mission duration (in hours). The rightmost performance map depicted in FIG. 11 depicts remaining physical endurance in the form of remaining endurance (in minutes) as a function of heart rate (in bpm) and skin temperature (in ° C.).

Figure 12:
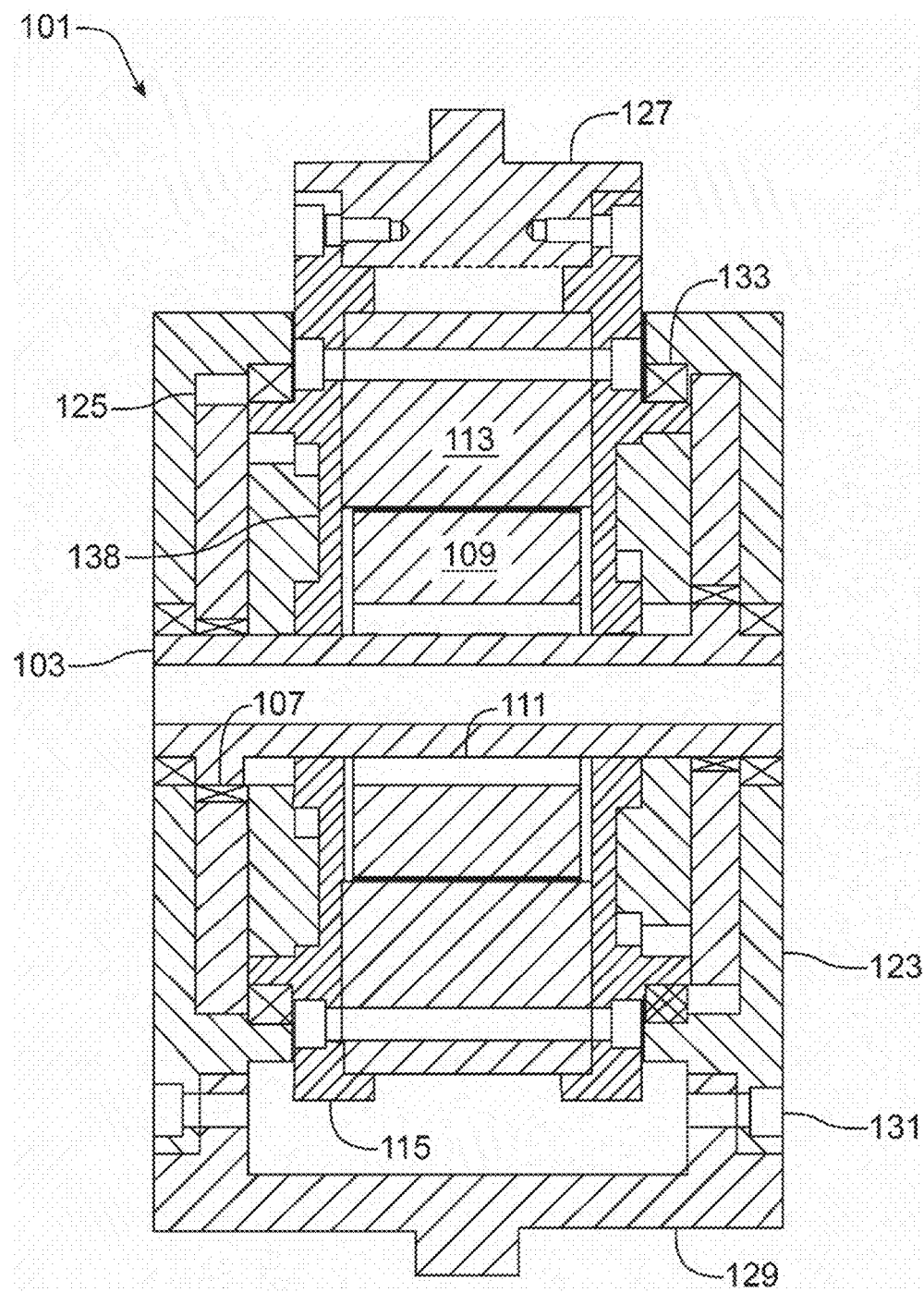
FIG. 12 is an illustration of a compact parallel eccentric (CPE) rotary actuator which may be utilized in some of the devices disclosed herein.

FIG. 12 depicts a first particular, non-limiting embodiment of a compact parallel eccentric (CPE) rotary actuator which may be utilized in the devices disclosed herein. Further details of this actuator may be found in U.S. Ser. No. 14/869,994 (Tesar), entitled "Compact Parallel Eccentric Rotary Actuator", which is incorporated herein by reference in its entirety. Some of the features and advantages of the CPE are summarized in TABLE 11 below.

TABLE 11

ORTHOTIC ACTUATOR BASED ON CPE
(High Torque Density/Clutched Cyclic Spring Energy)

ACTUATOR INTELLIGENCE
    Voice Commands
        Stand/Walk/Climb
        Exercise/Relax
        Be Efficient/Quiet
    Operational Software
        Embedded Performance
        Maps
        Multiple Sensors
        Failure Prediction
NEED FOR ORTHOTIC ACTUATOR
    10 Million Physically Disabled
        Activities of Dailey Living (ADL)
        Enable Work Force Participation
        Self-Sufficiency
    Tech noloqy Required
        100 ft-lb. Continuous
        200 ft-lb. Peak
        High Efficiency/Durability
    Similar Equipment Maps/Envelopes
EXCEPTIONAL TECHNOLOGY
    Hiqh Torque Density
        Less Than 5 lb.
        High Stiffness
        Very Compact
    Growth Potential
        Low Noise
        Cost Effective
        Efficient With reference to FIG. 12, the particular CPE rotary actuator 101 depicted therein comprises a crankshaft 103 equipped with first and second eccentrics 107. A rotor 109 is rotatably mounted on the crankshaft 103 and is separated therefrom by way of a rotor spacer 111. A stator 113 is rigidly supported on a pair of internal stator support plates 115 in closely spaced-apart relation to the rotor 109.

The CPE rotary actuator 101 is further equipped with first and second crosslinks 117 and with first and second eccentric gears 121. Each eccentric gear 121 is disposed between a crosslink 117 and one of first and second output plates 123 (also referred to herein as output gears).

As seen in FIG. 12, each crosslink 117 has a gap 125 adjacent thereto, and engages adjacent surfaces of the corresponding eccentric gear 121 and the internal stator support plate 115 across a tongue and groove surface 119. The CPE rotary actuator 101 is further equipped with a reference link 127, an output link 129, attachment lugs 131, principal bearings 133, shaft bearings 135, an internal gear 137, and a rotor spacer 139.

The CPE rotary actuator 101 of FIG. 12 leverages the structural integrity of the (preferably circular) stator 113 of the prime mover to effectively resist forces/moments in all directions. In particular, the rigidity of the stator 113 is enhanced by the addition of the two internal stator support plates 115, which are bolted to the sides of the stator 113 with small attachment wedges 145 to create a solid mating structure.

As noted above, in human assist and rehabilitation, there is a primary need for a very thin actuator capable of reasonable torque and high out-of-plane force/moments. To be useful, such an actuator must also be plug-and-play with quick-change interfaces (for rapid repair) and low cost by means of mass production.

The lowest cost actuators may ultimately be the most economically important. Low cost typically dictates the use of standard gear and bearing manufacture. Nonetheless, the standard epicyclic gear train is not preferable for many human assist and rehabilitation applications because it contains too many bearings, a rotating high inertia gear cage, and an excess of structure to maintain the gear alignments under high load or inertia forces.

Despite the foregoing, the epicyclic gear train also has some useful features. In particular, it has concentricity about a central axis, and utilizes mutually supportive planet gears which mesh with central sun gears. This concentricity keeps all forces balanced about the central axis, minimizes or eliminates out-of-plane moments, and imparts low force/ moments on the gear train shell structure. Also, the moving cage structure enables the planets to mesh with a stationary internal gear in the actuator shell. With care, this arrangement enables reductions of 40 up to 60-to-1 in a two-plane configuration.

Drawbacks of the epicyclic gear train include its high cage inertia, the excess of bearings, and the centrifugal forces of the planets on their bearings, all of which lead to higher deformations, more noise, more wear, and more backlash. To address these issues, it is preferred that all planet bearings be fixed (stationary) in strong/rugged cross plates (or what may be called strong back walls) which join to the outer cylindrical shell to the central gear axis to form a rugged and shock resistant structure. All bearings are preferably low velocity bearings except for the critical input pinion, which is usually driven by a high-speed prime mover. The star compound, therefore, has star gears, not planet gears. These star gears have fixed axes and can have one or two planes. Given two planes enables the use of a clutch in between to change the reduction ratios (as in two-speed drive wheels on vehicles). The star gear axes can then be extended through a strong back wall to a third plane of star gears to drive an internal output gear which provides a further reduction of about 6-to-1.

Altogether, this 3-plane star gear may provide reductions of 40 up to 60-to-1 in a very compact package. The last "internal" gear is the output usually supported by a very stiff/compact large diameter/small cross-section bearing. This bearing may be a ball bearing, a cross-roller bearing, or a grooved roller bearing, progressively with higher load capacity in a lower volume. All of these features make the star compound superior to the epicyclic gear train.

Figure 13:
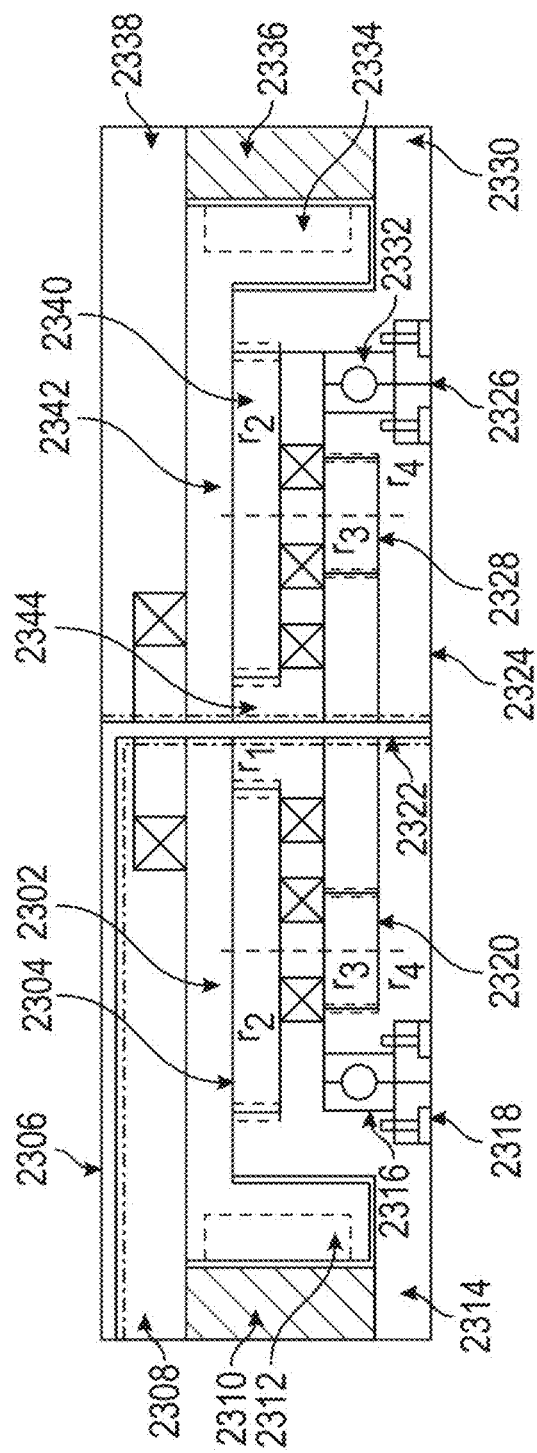
FIG. 13 is a pancake actuator which may be utilized in some of the devices disclosed herein.

FIG. 13 depicts a particular, non-limiting embodiment of a rotary actuator based on star compound gear principles which may be utilized in some of the devices and methodologies disclosed herein, and which is implemented in a very thin pancake configuration. The actuator 201 includes a top plate 203, a stator 205, a rotor 207, a stationary frame 209, a rotor disk 211, and an output plate 213. The actuator 201 further includes first 215 and second 217 star gears, a principal bearing 219, a seal 221, a pinion gear 223, a power wire 225 and a wire channel 227 for the power wire 225.

The gear train of the rotary actuator 201 includes an electric prime mover, which is preferably a brushless DC electric motor (BLDC). The BLDC is disposed in the same shell to create a fully integrated actuator. The stator 205 becomes the rugged outer structure of the actuator 201 joining the two strong back walls (the top plate 203 and the stationary frame 209) which holds the principal bearings 219.

The large diameter rotor 207 is inside the stator 205 with a rotor disk 211 supported by two central axis bearings. Preferably, this rotor 207 produces a high torque at relatively low speeds (such as, for example, 700 RPM). The rotor disk 211 is connected directly to the pinion gear 223 (r1) with an axis supported by a bearing in the top plate 203 and the stationary frame 209. The pinion gear 223 (r1) drives the fixed star gears 215 (r2) (preferably 3) which are concentric with the central axis of the actuator 201. The fixed star gears 215 are supported by bearings in the stationary frame 209 which is connected to the stator shell.

Each star gear axis contains first 215 and second 217 star gears (r2, r3) rigidly connected to each other. First 215 and second 217 star gears (r1, r2) are in plane 1 of the star compound gear train, while star gear 217 (r3) and internal stationary gear 231 (r4), which is a rigid part of the output plate 213, are in plane 2 of the star compound gear train. Star gear 217 (r3) then drives internal stationary gear 231 (r4). The internal stationary gear (r4) is supported by principal bearing 219, which is preferably a large diameter, small cross-section (and preferably low cost) ball bearing. The principal bearing 219 is preferably capable of carrying 3x (or more) thrust load than radial load, since all balls (there are many) simultaneously work to carry the thrust load.

To work in a quiet environment (almost no noise), it is preferred that the first star gears 215 (r2) are high quality plastic nylon gears. The top plate preferably plugs into the supporting structure (of the mobile platform) with a quick-change interface (both mechanically and electrically). The power and communication wiring extends through a wire channel 227 in the top plate 203 to the stator 205 (and related sensors), and also through the central axis to support the next actuator (i.e., by means of wire channel 227).

An issue of cost may arise in the unique nature of the principal bearing. Otherwise, very low cost BLDC's, controllers, sensors, star gears, supporting bearings should be mass produced to create a minimum set of this pancake actuator to populate a large population of assist/rehabilitation systems (mobile platforms, lifting arms, robot gurneys, orthotics, etc.). The goal is to maximize performance while reducing cost, making quick assembly possible by the clinician and rapid repair by the individual or caregiver.

To reduce costs, the actuator of FIG. 13 will preferably be produced in a minimum set featuring a number of predetermined sizes (say, 3", 4" and 5" diameters) for various end uses. The aspect ratio (diameter: thickness or height) is preferably within the range of about 6.5 to about 8.5, more preferably in the range of about 7 to about 8, and most preferably within the range of about 7.5 to about 7.8.

Figure 14:
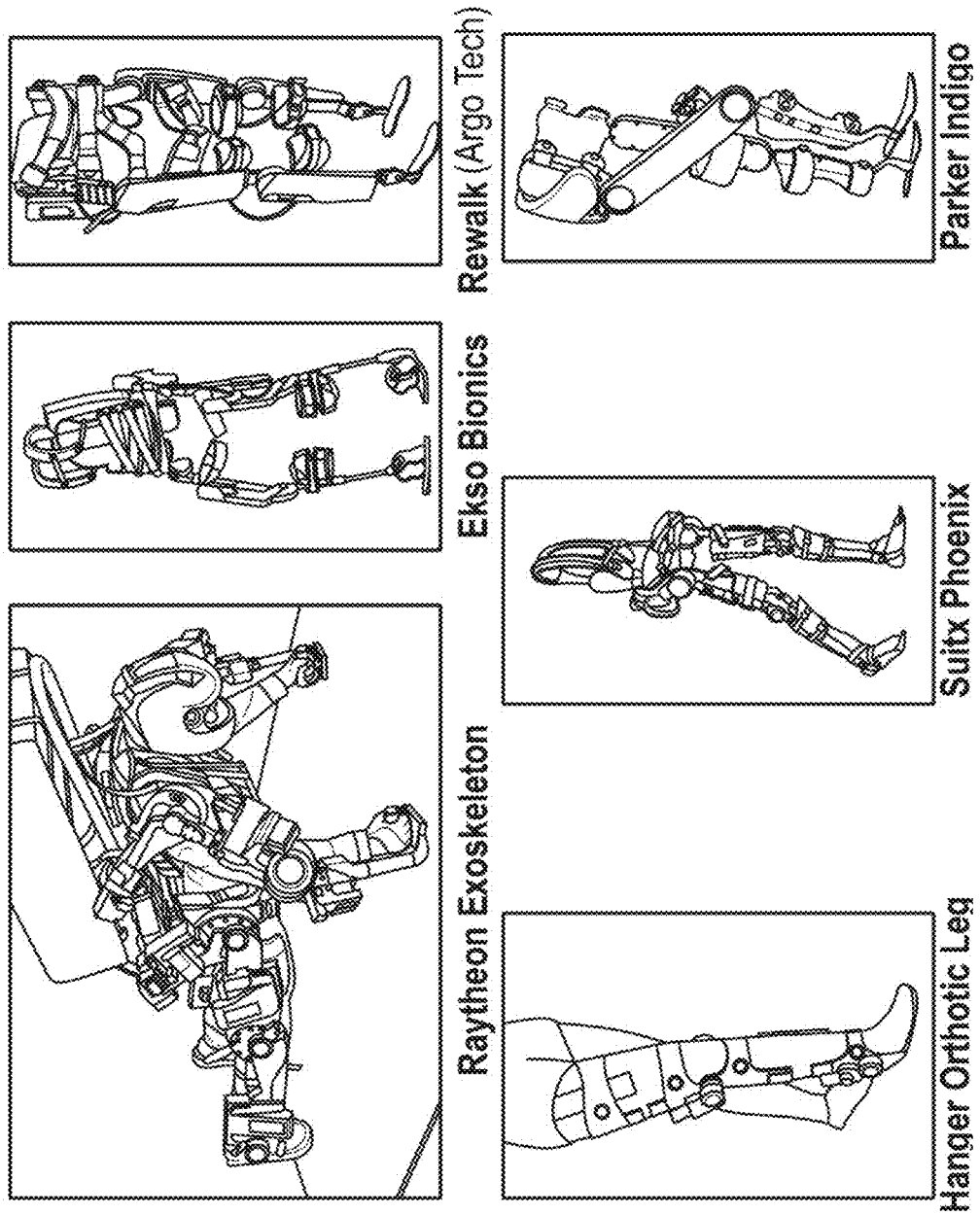
FIG. 14 is a series of illustrations of prior art orthotic/exoskeleton systems based on closed architecture designs.
Figure 15:
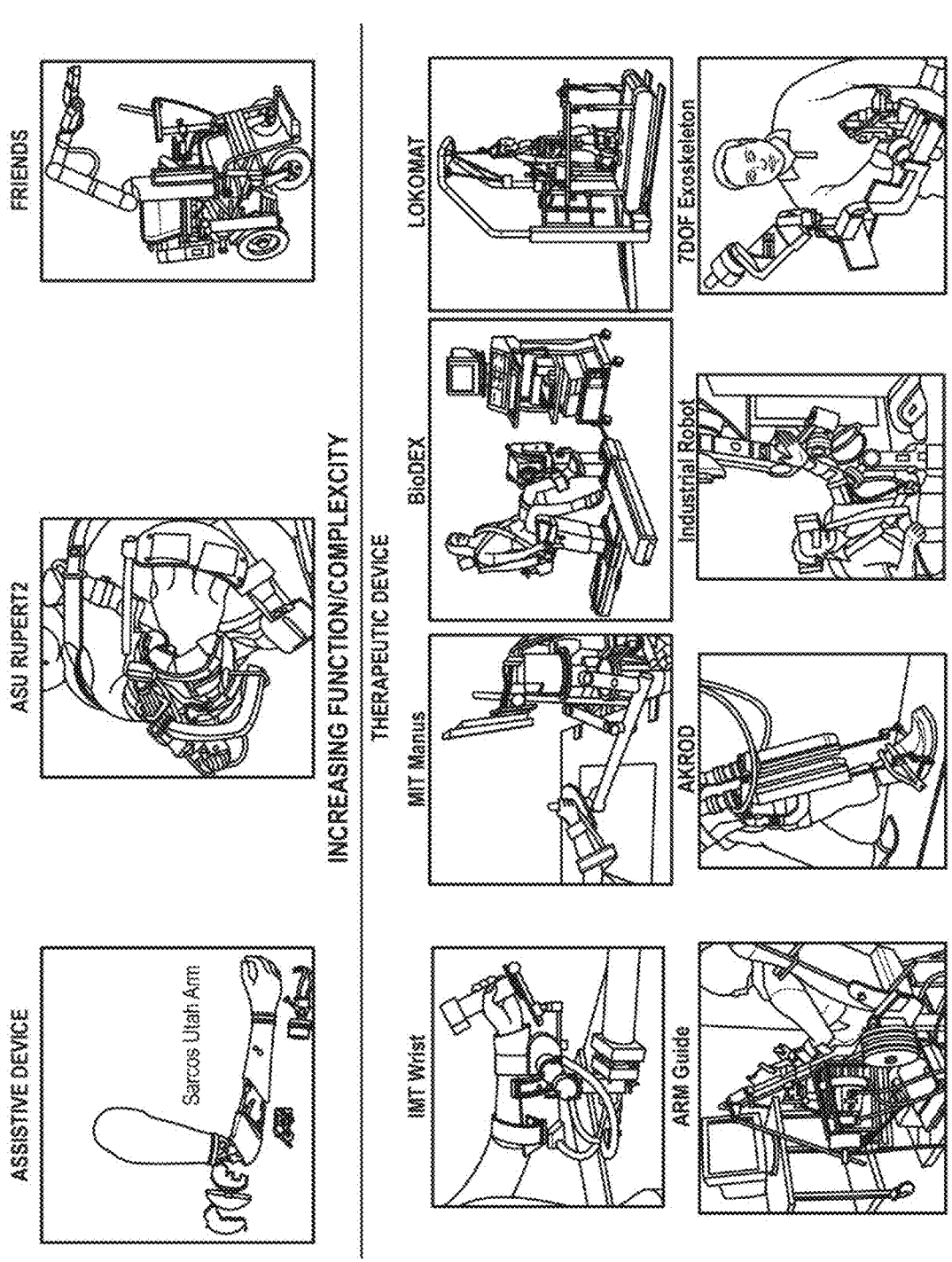
FIG. 15 is a series of illustrations collection of various prior art special purpose rehabilitation devices.

It is notable that the actuators of FIG. 12-13 are capable of providing torque densities at the levels required for human assist and rehabilitation. By contrast, many of the prior art devices depicted in FIGS. 14-15 suffer from low torque densities, which limits their usefulness.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. It will also be appreciated that the various features set forth in the claims may be presented in various combinations and sub-combinations in future claims without departing from the scope of the invention. In particular, the present disclosure expressly contemplates any such combination or sub-combination that is not known to the prior art, as if such combinations or sub-combinations were expressly written out.

What is claimed is:
1. An orthotic device, comprising:
a first structural element;
a second structural element attached to said first structural element by way of a joint;

a link disposed about said joint, said link terminating in a first receptacle on a first end thereof, and terminating in a second receptacle on a second end thereof;

first and second actuators disposed in said first and second receptacles, respectively;

a first brace terminating in a third receptacle on a first end thereof, and attached to said first structural element on a second end thereof; and a second brace terminating in a fourth receptacle on a first end thereof, and attached to said second structural element on a second end thereof;

wherein said first actuator is disposed in a first container formed by said first and third receptacles, and said second actuator is disposed in a second container formed by said second and fourth receptacles.

2. The orthotic device of claim 1, wherein said first and second actuators are rotary actuators.

3. The orthotic device of claim 1, wherein said first and second actuators are parallel eccentric actuators.

4. The orthotic device of claim 1, wherein said first and second actuators are compact parallel eccentric actuators.

5. The orthotic device of claim 1, wherein each of said first and second rotary actuators is a pancake actuator.

6. The orthotic device of claim 1, wherein each of said first and second rotary actuators is a star compound actuator.

7. The orthotic device of claim 1, wherein said first structural element is configured to attach to a human forearm.

8. The orthotic device of claim 1, wherein said first actuator comprises:

a frame and a plate disposed in opposing relation to each other; a stator disposed between said frame and said plate; a rotor disk equipped with a rotor and disposed within said stator such that said rotor is adjacent to said stator; a pinion gear; and first and second star gears disposed between said frame and said plate, wherein each of said first and second star gears meshes with said pinion gear and said frame.

9. The orthotic device of claim 1, wherein said actuator moves said first structural element relative to said second structural element.

10. The orthotic device of claim 1, wherein each of said first and second star gears contains a plurality of gears rigidly connected to each other.

11. The orthotic device of claim 1, wherein said plate forms a first exterior surface of said actuator, wherein said stator forms at least a portion of a second exterior surface of said actuator which is perpendicular to said first surface, and wherein said second major surface has a larger diameter than said first major surface.

* * * * *